US005256906A

United States Patent [19]

Tsuge et al.

[11] Patent Number: 5,256,906

[45] Date of Patent: Oct. 26, 1993

[54] MECHANISM FOR SWITCHING FROM INDEPENDENT TO SYNCHRONOUS, OR VICE VERSA THE OPERATIONAL SETTING OF A DUST COLLECTOR WITH A RECEPTACLE FOR SUPPLYING ANOTHER POWER TOOL WITH WHICH THE DUST COLLECTOR IS TO BE OPERATED SYNCHRONOUSLY

[75] Inventors: Kazunori Tsuge, Okazaki; Yukimi Amano, Anjo, both of Japan

[73] Assignee: Makita Corporation, Japan

[21] Appl. No.: 785,941

[22] Filed: Oct. 31, 1991

[30] Foreign Application Priority Data

Apr. 19, 1991 [JP] Japan .............................. 3-36249[U]

[51] Int. Cl.[5] .............................................. H02J 3/00

[52] U.S. Cl. ...................................... 307/39; 307/131; 307/155

[58] Field of Search .................... 307/38, 39, 112–116, 307/125, 131, 140, 155; 361/187; 15/319; 55/385.1, 385.3, 385.5, 385.6

[56] References Cited

U.S. PATENT DOCUMENTS

| | | | | |
|---|---|---|---|---|
| B1 | 4,070,586 | 10/1990 | Breslin | 307/22 |
| | 4,675,537 | 6/1987 | Mione | 307/38 |
| | 4,970,623 | 11/1990 | Pintar | 361/187 |
| | 5,099,157 | 3/1992 | Meyer | 307/632 |
| | 5,120,983 | 6/1992 | Samann | 307/38 |

FOREIGN PATENT DOCUMENTS

| | | |
|---|---|---|
| 2748174 | 5/1979 | Fed. Rep. of Germany . |
| 3710619 | 10/1988 | Fed. Rep. of Germany . |
| 63-191580 | 8/1988 | Japan . |

*Primary Examiner*—Jeffrey A. Gaffin

*Attorney, Agent, or Firm*—Lahive & Cockfield

[57] ABSTRACT

A mechanism for switching from independent to synchronous, or vice versa an operational setting of a dust collector with a receptacle for supplying another power tool with which the dust collector is to be operated synchronously. This mechanism comprises a first switch connected in series both to a power switch of the dust collector and to an electric motor thereof, a second switch connected in series both to said power switch and to said electric motor, but arranged in parallel with the first switch, a lid which can be closed to close said receptacle or opened to expose said receptacle, a rod which engages the lid to close the first switch when the lid is closed, thus conditioning the dust collector for independent operation, and which disengages from the lid to open the first switch when the lid is opened, and a second-switch activating member for closing the second switch to operate the dust collector synchronously with another power tool when the other power tool is supplied through the receptacle. The second-switch activating member includes a current detector provided in a circuit connecting the power switch and the receptacle and located between the power switch and the receptacle and a relay connected to the current detector and having the above-mentioned second switch as a contact.

4 Claims, 6 Drawing Sheets

MECHANISM FOR SWITCHING FROM INDEPENDENT TO SYNCHRONOUS, OR VICE VERSA THE OPERATIONAL SETTING OF A DUST COLLECTOR WITH A RECEPTACLE FOR SUPPLYING ANOTHER POWER TOOL WITH WHICH THE DUST COLLECTOR IS TO BE OPERATED SYNCHRONOUSLY

FIELD OF THE INVENTION

This invention relates to a mechanism for switching the operational setting of a dust collector from independent to synchronous, or vice versa, and more particularly relates to such a mechanism for use with a dust collector having a receptacle for supplying another power tool with which the dust collector is to be operated synchronously.

BACKGROUND OF THE INVENTION

In Japanese Patent Application No. 62-19371 (published under No. 63-191580) the applicant has proposed a controller for operating a dust collector synchronously with another power tool such as an electric plane. In use, the controller is plugged into a wall receptacle. The controller has two receptacles. An electric plane is plugged into one receptacle, while a dust collector is plugged into the other receptacle. The electric plane and the dust collector are connected to each other by a hose. When the electric plane is switched on, the electric plane and the dust collector start at the same time. Thus, the dust collector absorbs dust produced by the electric plane, through the hose, while the electric plane is operating. When the electric plane is switched off, the dust collector also stops simultaneously.

Another prior mechanism for operating a dust collector synchronously with another power tool is simpler, and includes a receptacle provided in the dust collector for supplying another power tool. The dust collector is plugged into a wall receptacle. Another power tool is plugged into the receptacle of the dust collector. The dust collector is first switched on. However, the dust collector does not start. Then, the other power tool is switched on. Thereupon, the two apparatus start at the same time. Switching off the other power tool stops the dust collector simultaneously with the other power tool.

The latter synchronizing mechanism also includes a switch provided in the dust collector for switching the operational setting of the dust collector from independent to synchronous, or vice versa. For discussion's sake, let it be supposed that an electric plane is another power tool to be operated synchronously with the dust collector. For synchronous operation, the user sets the dust collector for synchronous operation. At the same time, before plugging the electric plane into the dust collector, he usually ensures that the power switches of the two apparatus are both OFF. By so doing, he can ensure complete safety. However, even in the event he plugs one into the other without ensuring it, he will not get into danger if at least one of the two power switches fortunately happens to be OFF. However, if he plugs one into the other when the two power switches are both ON, the two apparatus will unexpectedly start the very moment he plugs one into the other. It is a dangerous situation.

Usually the power switch of the dust collector is OFF when the user plugs the dust collector into a wall receptacle. The operational setting of the dust collector is an independent operation or a synchronous operation. However, if its setting is already a synchronous operation and at the same time its power switch is ON, plugging the dust collector into a wall receptacle does not start it. Thus, in such a case, it is possible that the user may erroneously assume that the power switch of the dust collector is OFF. He may be more careless about the power switch of the electric plane than about that of the dust collector because he will not get into danger if he plugs the electric plane into the dust collector when the power switch of the latter is ON, provided the power switch of the former is OFF. Thus, it is desirable to provide a synchronizing mechanism which enables the user to automatically ensure that the power switch of the dust collector is OFF when the power tool with which the dust collector is to be operated synchronously is not plugged into the dust collector.

SUMMARY OF THE INVENTION

It is an object of the invention to provide a mechanism for switching from independent to synchronous, or vice versa the operational setting of a dust collector with a receptacle for supplying another power tool with which the dust collector is to be operated synchronously.

Another object of the invention is to provide such a mechanism which helps to ensure that the power switch of the dust collector is OFF when another power tool is not plugged into the dust collector.

According to the invention, an operational-setting switching mechanism comprises a first switch connected in series both to a power switch of the dust collector and to an electric motor thereof, a second switch connected in series both to said power switch and to said electric motor, but arranged in parallel with the first switch, a lid which can be closed to close said receptacle or opened to expose said receptacle, a rod which engages the lid to close the first switch when the lid is closed, thus conditioning the dust collector for independent operation, and which disengages from the lid to open the first switch when the lid is opened, and means provided in a circuit connecting said power switch and said receptacle and located between said power switch and said receptacle for closing the second switch when current flows through said means, thereby starting the dust collector synchronously with another power tool.

DETAILED DESCRIPTION OF A PREFERRED EMBODIMENT

Figure 1:
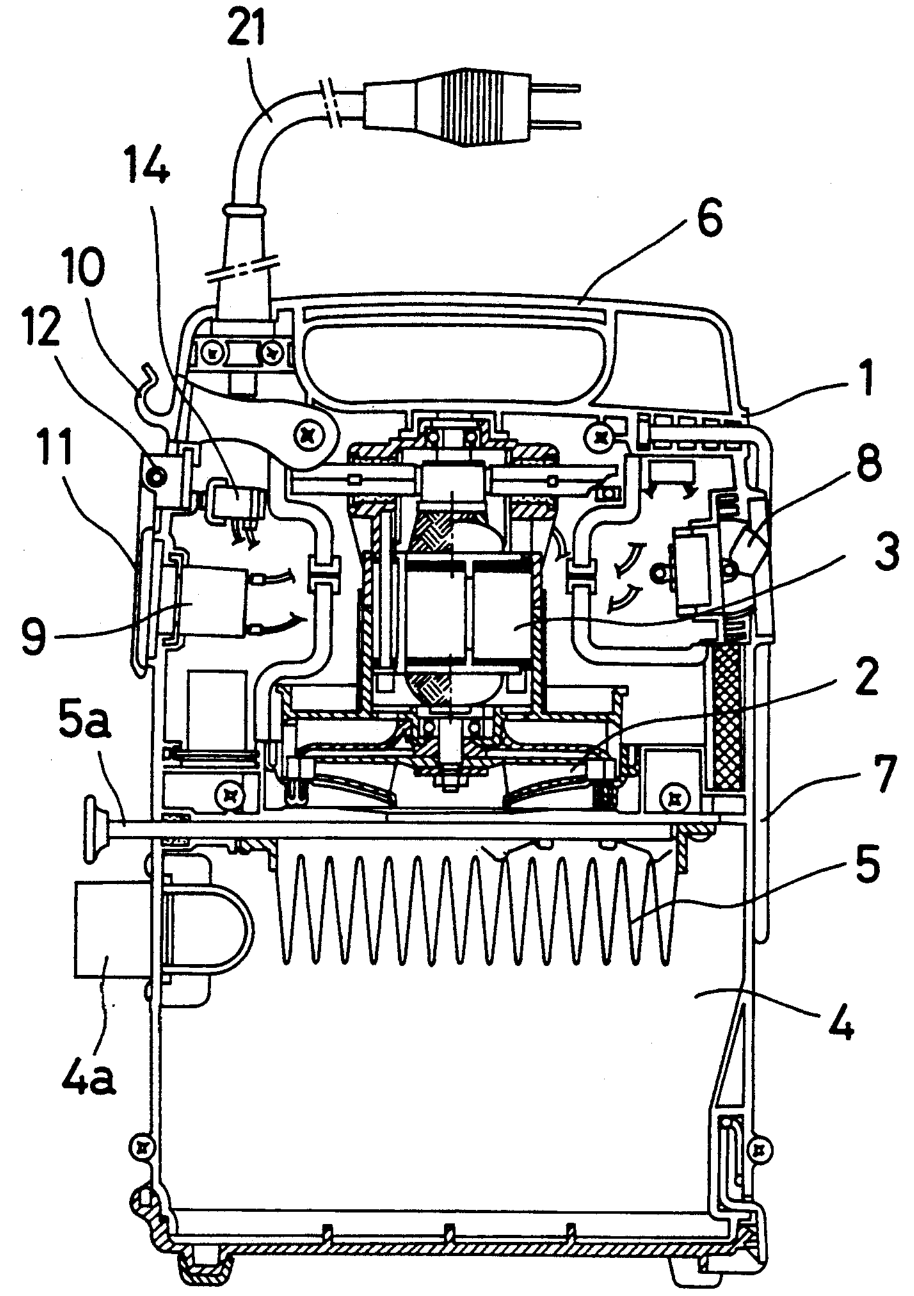
FIG. 1 shows the inner construction of a dust collector.

A preferred embodiment of the invention will now be described with reference to the drawing.

Figure 4:
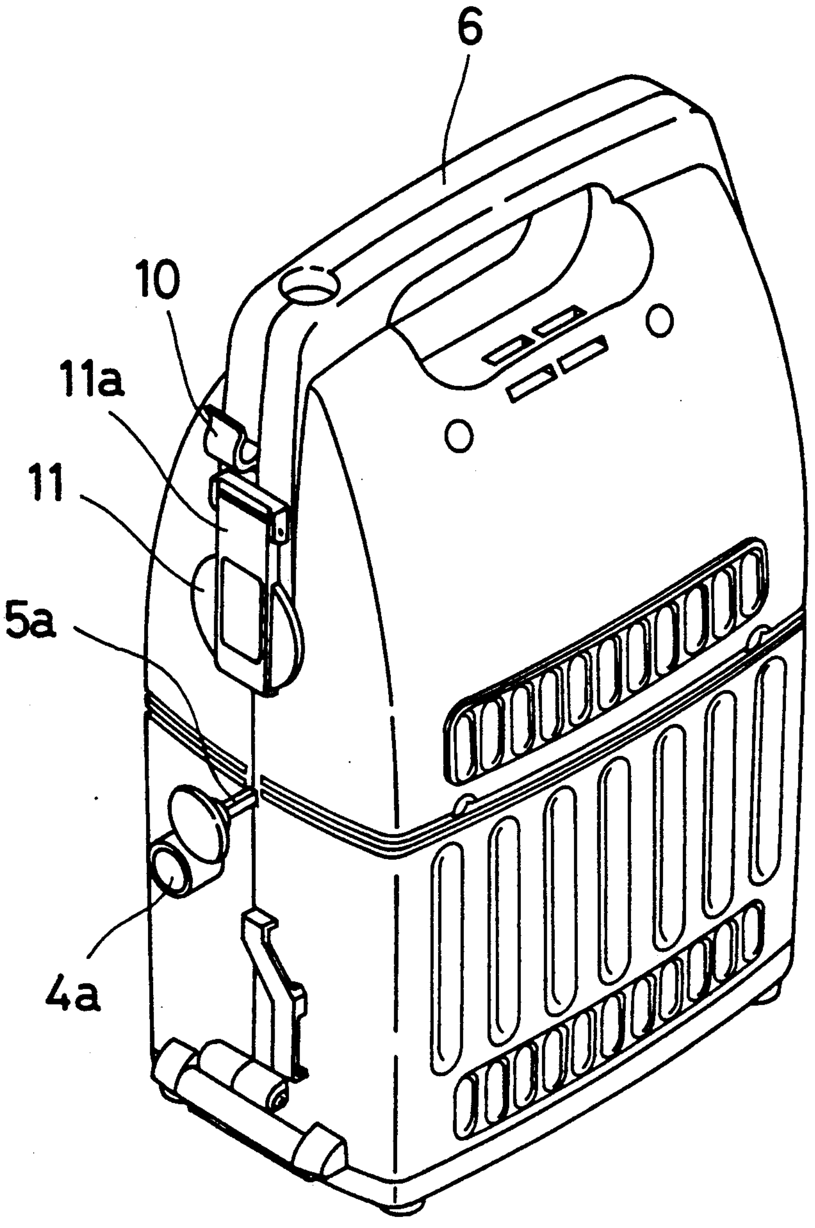
FIG. 4 is a perspective view of the dust collector.
Figure 6:
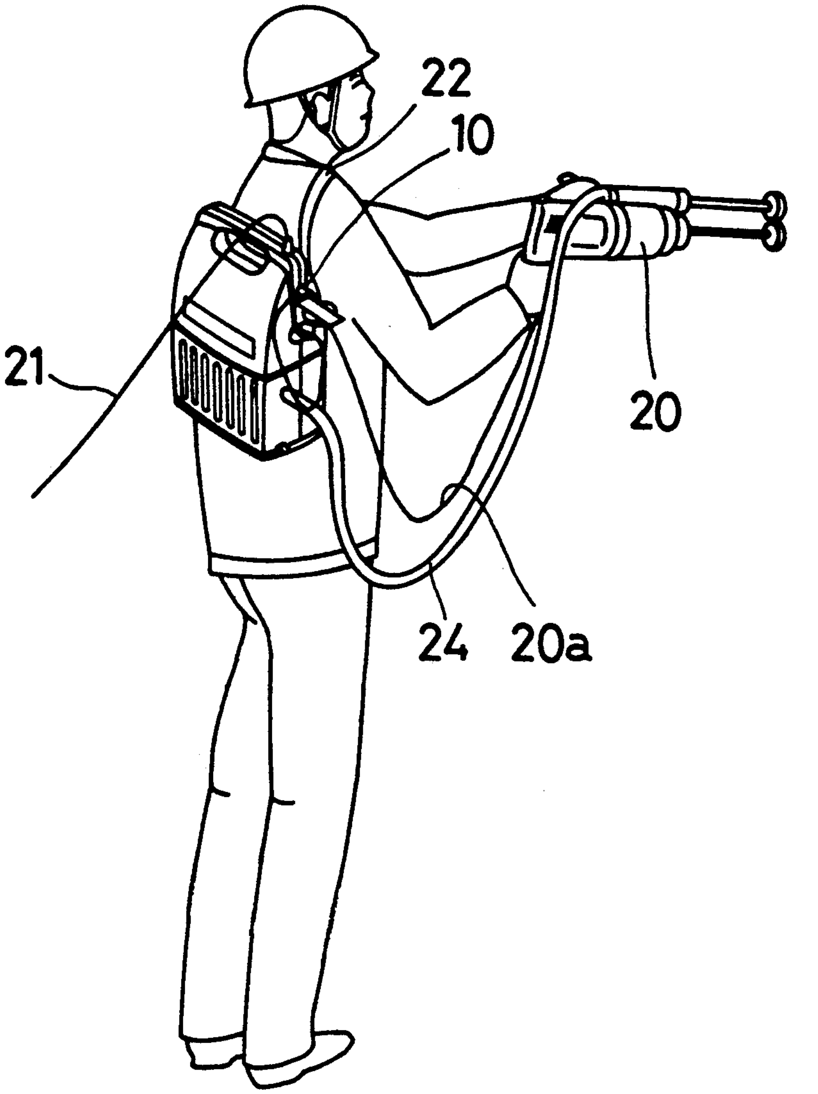

FIG. 4 shows a dust collector having an inner construction of FIG. 1. In FIG. 1 reference numeral 1 designates a housing. In the housing 1 an electric motor 3 is provided. The motor 3 rotates a blower 2. A dust collecting chamber 4 is provided in the lower portion of the housing 1. The dust collecting chamber 4 is in communication with a dust inlet 4*a* to which a hose 24 (FIG. 6) is connected. Thus, dust is absorbed from the hose 24 into the chamber 4. A filter 5 is located in the chamber 4. The filter 5 is connected to a lever 5*a*. Dust absorbed into the chamber 4 may attach to the filter 5. Such dust can be removed from the filter 5 by moving the lever 5*a* to the right and left (in FIG. 1). Reference numeral 6 designates a handle. The user can hold the handle 6 to carry the dust collector. Reference numeral 7 designates a hook for hanging the dust collector. Also, a belt 22 (FIG. 6) can be connected to the upper portion of the housing 1. As shown in FIG. 6, the user can put the belt 22 on his shoulder to carry the dust collector on his back. Reference numeral 10 designates a hook for supporting a cord 20*a* of a hammer drill 20. Reference numeral 21 designates a cord of the dust collector. In use, the cord 21 is connected to a source of electric power, such as a wall receptacle.

Figure 5:
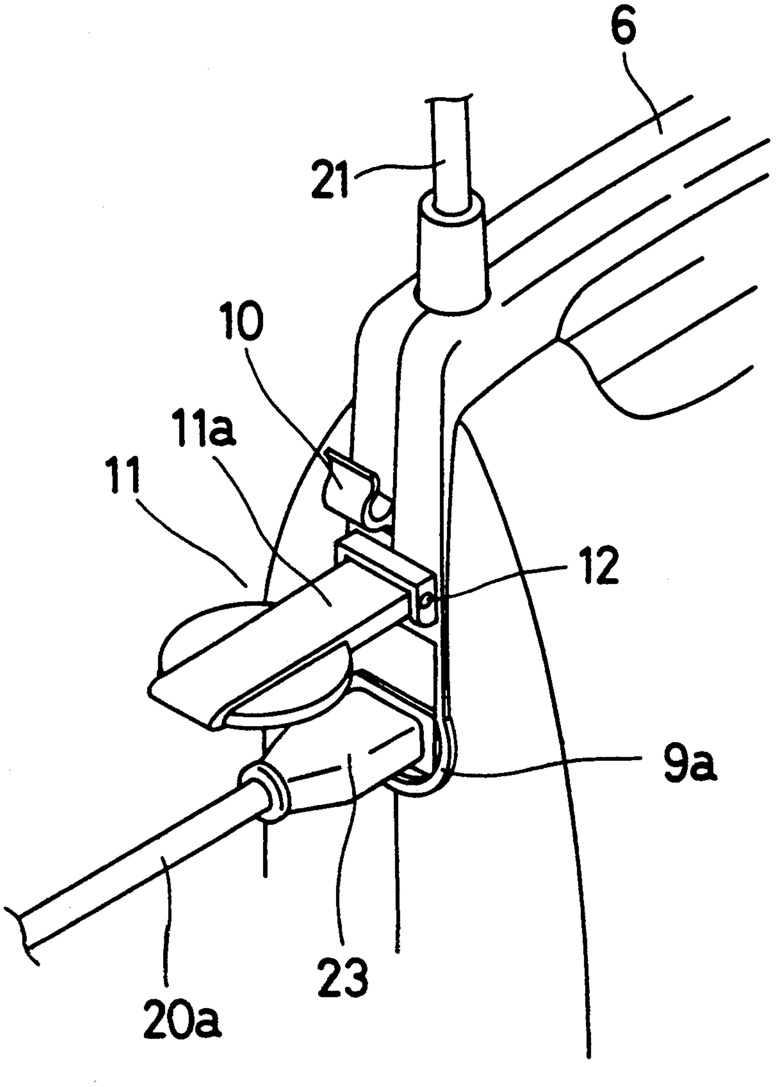
In FIG. 5 the lid of the dust collector is opened, and a plug of another power tool is inserted into the receptacle of the dust collector; and In FIG. 6 the dust collector is being operated synchronously with another power tool.

A power switch 8 is also provided in the housing 1. The power switch 8 can be pressed from the outside. Also, a receptacle 9 is provided in the housing 1. The receptacle 9 has an inlet defined by a circular frame 9*a* (FIG. 5). As shown in FIG. 5, a plug 23 of the hammer drill 20 can be inserted into the receptacle 9. However, when the plug 23 is not inserted into the receptacle 9, the receptacle 9 can be closed by a lid 11. The lid 11 has an arm member 11*a* which is connected on a pivot 12. Thus, the lid 11 can be turned between a horizontal position (FIG. 5) where the lid 11 does not close the receptacle 9 and a vertical position (FIG. 4) where the lid 11 closes the receptacle 9. However, the lid 11 is urged toward the vertical position by a torsion spring 13 (FIG. 2) wound round the pivot 12 and having one end fixed to the arm member 11*a*. Thus, with only a slight touch on the lid 11, the lid 11 springs to the vertical position.

Figure 2:
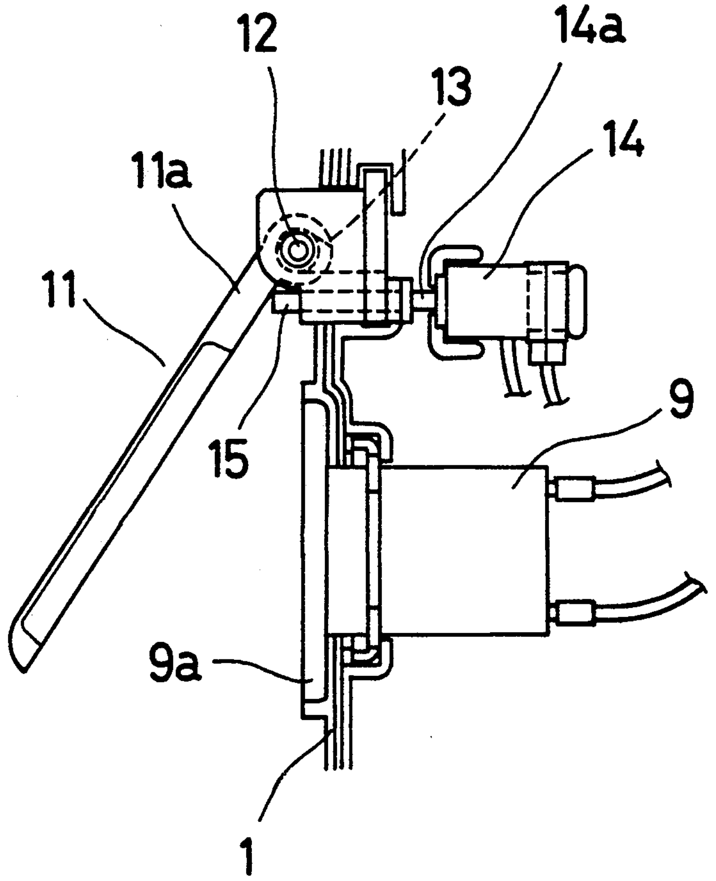
FIG. 2 shows a receptacle and a lid of the dust collector.

Referring to FIG. 2, when the lid 11 is turned to the vertical, closing position (FIG. 4), the lid 11 engages a rod 15 and moves it inward. When the rod 15 is moved inward, the rod 15 presses a button 14*a* of a switch 14 (which will be described below) to close the switch 14. However, the button 14*a* is urged to the left (in FIG. 2) by a spring (not shown) provided in switch 14. Thus, when the lid 11 is opened, the button 14*a* is released, or is moved to the left (in FIG. 2), to open the switch 14. When the button 14*a* is thus released, the button 14*a* moves the rod 15 to the left such that the left end of the rod 15 projects outward from the housing 1 (FIG. 15).

Thus, closing the lid 11 closes the switch 14, while opening the lid 11 opens the switch 14.

Figure 3:
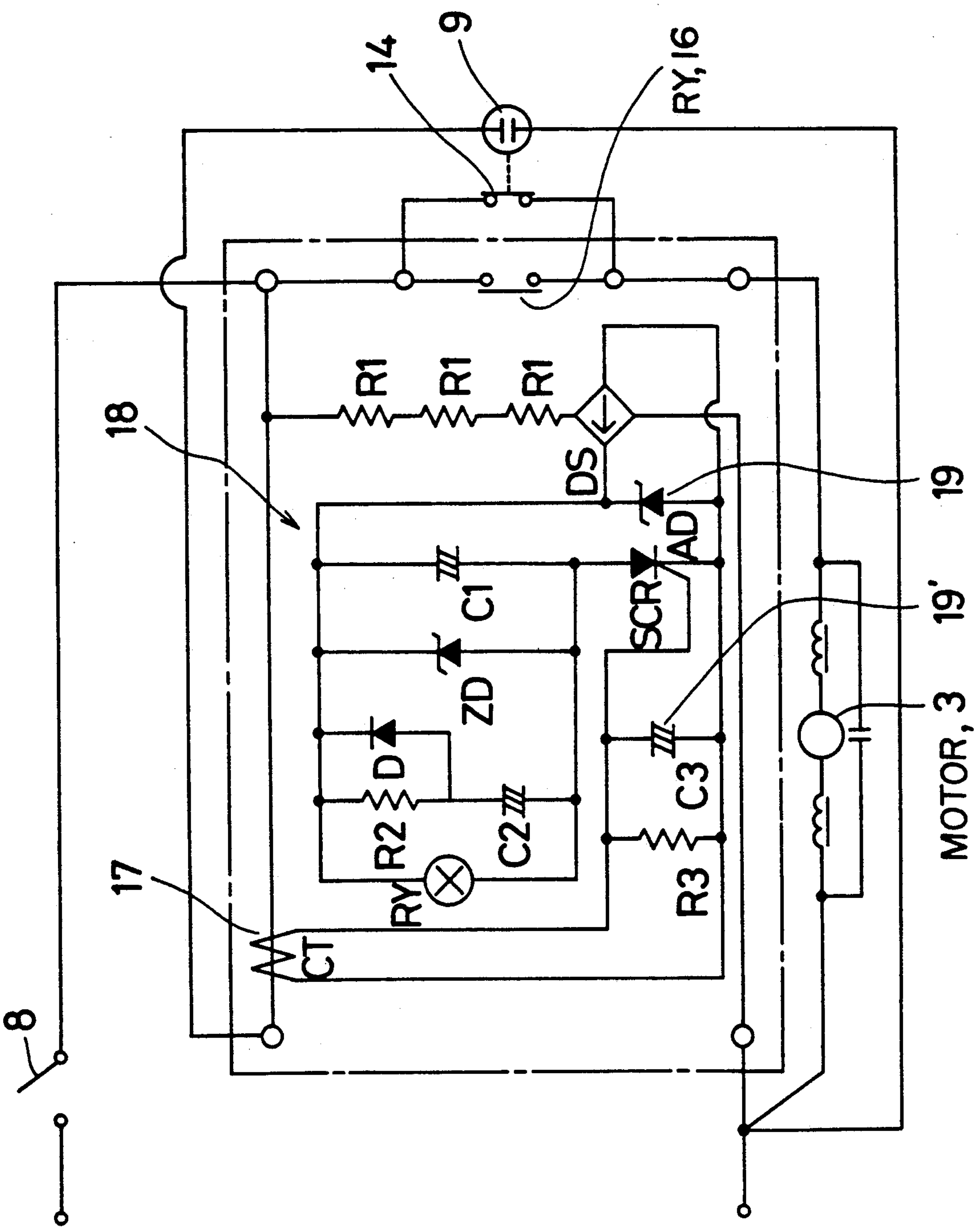
FIG. 3 shows an electric circuit used in the dust collector.

FIG. 3 shows an electric circuit used in the dust collector. The switch 14 is connected in series with the power switch 8. The switch 14 will hereafter be referred to as a "first switch". A second switch 16 is also connected in series with the power switch 8, but is arranged in parallel with the first switch 14. The receptacle 9 is also connected with the power switch 8. Both the switches 14 and 16 are connected with the electric motor 3. A current transformer 17 is connected between the power switch 8 and the receptacle 9. When current flows through the current transformer 17, the current transformer 17 supplies a relay RY. When the relay RY is thus energized, the relay RY closes the second switch 16. It is the only time the second switch 16 is closed. To be exact, the second switch 16 is a contact of the relay RY.

A time delay means 18 is also provided in the circuit. Also, an avalanche diode 19 and a condenser 19' are provided to prevent noise.

The dust collector can be used either independently of or synchronously with the drill 20. For either use, the cord 21 of the dust collector must be connected to a power source, such as a wall receptacle.

For independent operation, the user closes the lid 11 (FIG. 4). By so doing, the first switch 14 is closed. Then, the power switch 8 is pressed. Thereupon, current flows through the first switch 14 to the motor 3. The dust collector thus starts. The second switch 16 is open.

For synchronous operation, the hose 24 is attached on the drill 20. Then, the lid 11 is opened to expose the receptacle 9. By so doing, the first switch 14 is opened. Then, the drill plug 23 is inserted into the receptacle 9. Then, the power switch 8 of the dust collector is pressed. Pressing the power switch 8, however, does not start the dust collector since both the first and second switches 14 and 16 are now open. Then, the drill 20 is switched on. Thereupon, current flows through the current transformer 17 and the receptacle 9 to the drill 20. The drill 20 starts. At the same time, when the current has flowed through the current transformer 17, the current transformer 17 supplies the relay RY and, hence, the relay RY closes its contact, or the second switch 16. Thereupon, current also flows through the second switch 16 to the motor 3. The dust collector thus starts at substantially the same time as the drill 20.

FIG. 6 illustrates synchronous operation. As illustrated, the user can perform a drilling operation while absorbing dust produced by the drilling operation, by the dust collector. When the drilling operation has been finished, the user switches off the drill 20. Thereupon, current no longer flows through the current transformer 17 and, hence, the current transformer 17 no longer energizes the relay RY. The second switch 16 is thus opened. Thus, the dust collector is stopped simultaneously with the drill 20 (without opening the power switch 8). However in actuality, due to the time delay means 18, the dust collector continues operating for a few seconds after the drill 20 has been switched off. Thus, the dust collector can absorb all the dust which would otherwise remain in the hose 24.

With regard to synchronous operation, before opening the lid 11, the user naturally ensures both that the dust collector is not operating and that the lid 11 is closed. It means that he automatically ensures that the power switch 8 is OFF. Then, he opens the lid 11. Now let it be supposed that the drill switch happens to be ON. Then, if he is careless to insert the drill plug 23 into the receptacle 9 without being aware that the drill switch is ON, the two apparatus (drill 20 and dust collector) do not unexpectedly start because the collector switch 8 is OFF.

Although the invention has been described as a mechanism for use with the hammer drill 20, it can be used with any other power tool which produces dust by operating.

The time delay means 18 may be omitted if it does not matter that a slight amount of dust remains in the hose 24 after the drill has been switched off.

In the embodiment described, closing the lid 11 closes the switch 14, while opening the lid 11 opens the switch 14. If desired, however, both the lid 11 and the rod 15 may be omitted and instead a rod-shaped member projecting into the receptacle 9 may be provided for engaging the drill plug 23 to open the switch 14 when the drill plug 23 is inserted in the receptacle 9.

What is claimed is:

1. In a mechanism for switching from independent to synchronous or vice versa an operational setting of a dust collector having a receptacle for supplying another power tool with which the dust collector is to be operated synchronously, said mechanism including (a) a first switch connected in series both to a power switch of the dust collector and to an electric motor thereof for independent operation of the dust collector, (b) a second, switch connected in series both to said power switch and to said electric motor, but arranged in parallel with the first switch, and (c) means for closing the second switch to operate the dust collector synchronously with the other power tool when electric current is supplied to the other power tool through the receptable, an improvement comprising safety means which is provided in conjunction with said receptacle and which can be operated to close the first switch when the other power tool is not plugged into said receptacle and to open the first switch when the other power tool is plugged into said receptacle.

2. In a mechanism in accordance with claim 1 the further improvement wherein said safety means includes (i) a lid which can be closed to close said receptacle or opened to expose said receptacle and (ii) a rod which engages the lid to close the first switch when the lid is closed and which disengages from the lid to open the first switch when the lid is opened.

3. In a mechanism in accordance with claim 1 wherein said means for closing the second switch comprises (i) a current detecting means provided in a circuit connecting said power switch and said receptacle and located between said power switch and said receptacle and (ii) a relay connected to said current detecting means and having said second switch as a contact, said current detecting means supplying electric current to said relay when the electric current for operating the other power tool flows through said current detecting means, thereby activating said relay to close said second switch.

4. A mechanism for switching from independent to synchronous, or vice versa an operational setting of a dust collector having a receptacle for supplying another power tool with which the dust collector is to be operated synchronously, said mechanism comprising (i) a first switch connected in series both to a power switch of the dust collector and to an electric motor thereof, (ii) a second switch connected in series both to said power switch and to said electric motor, but arranged in parallel with said first switch, (iii) a lid which can be closed to close said receptacle or opened to expose said receptacle, (iv) a rod which engages said lid to close said first switch when the lid is closed, thereby conditioning the dust collector for independent operation, and which disengages for the lid to open said first switch when said lid is opened, and (v) means for closing said second switch to operate the dust collector synchronously with said other power tool when electric current is supplied to said other power tool through said receptacle, said means for closing the second switch including (a) a current detecting means provided in a circuit connecting said power switch and said receptacle and located between said power switch and said receptacle and (b) a relay connected to said current detecting means and having said second switch as a contact, said current detecting means supplying electric current to said relay when electric current for operating said other power tool flows through said current detecting means, thereby activating said relay to close said second switch.

* * * * *